United States Patent
Poptani et al.

(10) Patent No.: US 11,225,173 B2
(45) Date of Patent: Jan. 18, 2022

(54) SEAT-TRACK ASSEMBLY

(71) Applicant: FISHER & COMPANY, INCORPORATED, St. Clair Shores, MI (US)

(72) Inventors: Sapan Mahendra Poptani, Northville, MI (US); Raghu Belagur Sathyanarayanasetty, Roseville, MI (US); Ratnakar Sidramappa Bolkote, Macomb, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 0 days.

(21) Appl. No.: 17/172,148

(22) Filed: Feb. 10, 2021

(65) Prior Publication Data

US 2021/0245633 A1    Aug. 12, 2021

Related U.S. Application Data

(60) Provisional application No. 62/975,453, filed on Feb. 12, 2020.

(51) Int. Cl.
*B60N 2/08* (2006.01)

(52) U.S. Cl.
CPC ......... *B60N 2/0818* (2013.01); *B60N 2/0875* (2013.01)

(58) Field of Classification Search
CPC .. B60N 2/0818; B60N 2/0875; B60N 2/0705; B60N 2/0727; B60N 2/0715;

(Continued)

(56) References Cited

U.S. PATENT DOCUMENTS 4,712,759 A    12/1987    Sugama et al.
5,772,173 A    6/1998     Couasnon
(Continued)

FOREIGN PATENT DOCUMENTS

DE    102004013188 A1    10/2004
DE    102004056430 B3    9/2005
(Continued)

OTHER PUBLICATIONS

International Search Report regarding International Application No. PCT/US2012/060605, dated Mar. 29, 2013.

(Continued)

*Primary Examiner* — Nkeisha Smith
(74) *Attorney, Agent, or Firm* — Harness, Dickey & Pierce, P.L.C.

(57) ABSTRACT

A vehicle seat-track assembly is provided and may include a first track member having a series of locking features and a second track member slidably supported by the first track member. The seat-track assembly may also include a locking mechanism having locking pawls movable between a locked state engaged with the locking features to restrict relative movement between the first and second track members and an unlocked state disengaged from the locking features to permit relative movement between the first and second track members. The locking pawls may each include locking elements that are received within respective ones of the series of locking features in the locked state such that the locking elements restrict relative movement between the first track member and the second track member in two directions when the locking pawls are in the locked state.

21 Claims, 7 Drawing Sheets

(58) Field of Classification Search
CPC .. B60N 2/0843; B60N 2/0862; B60N 2/0831; B60N 2/0868; B60N 2/0806
USPC .............. 248/424, 429, 430; 296/65.13
See application file for complete search history.

(56) References Cited

U.S. PATENT DOCUMENTS

| | | | |
|---|---|---|---|
| 5,816,110 | A | 10/1998 | Schuler et al. |
| 5,913,947 | A | 6/1999 | Groche |
| 5,931,436 | A | 8/1999 | Rohee |
| 6,113,051 | A | 9/2000 | Moradell et al. |
| 6,322,036 | B1 | 11/2001 | Tame et al. |
| 6,354,553 | B1 | 3/2002 | Lagerweij et al. |
| 6,637,712 | B1 | 10/2003 | Lagerweij |
| 6,641,104 | B2 | 11/2003 | Flick |
| 6,648,292 | B2 | 11/2003 | Flick et al. |
| 6,843,532 | B2 | 1/2005 | Borbe et al. |
| 6,892,995 | B2 | 5/2005 | Tame et al. |
| 7,000,880 | B2 * | 2/2006 | Jaudouin ............ B60N 2/08 248/429 |
| 7,066,521 | B2 | 6/2006 | Jung et al. |
| 7,172,249 | B2 | 2/2007 | Rausch et al. |
| 7,207,541 | B2 | 4/2007 | Frohnhaus et al. |
| 7,293,752 | B2 | 11/2007 | McCulloch et al. |
| 7,328,877 | B2 * | 2/2008 | Yamada ............ B60N 2/0705 248/430 |
| 7,600,816 | B2 | 10/2009 | Bauersachs et al. |
| 7,722,006 | B2 | 5/2010 | Beneker et al. |
| 7,780,138 | B1 * | 8/2010 | Lee .............. B60N 2/0818 248/429 |
| 7,850,137 | B2 | 12/2010 | Abdella et al. |
| 7,980,525 | B2 | 7/2011 | Kostin |
| 8,029,063 | B2 | 10/2011 | Kazyak et al. |
| 8,201,798 | B2 * | 6/2012 | Nihonmatsu ........ B60N 2/0705 248/430 |
| 8,215,602 | B2 * | 7/2012 | Walter ................ B60N 2/0893 248/424 |
| 8,376,460 | B2 | 2/2013 | Nadgouda et al. |
| 8,870,147 | B2 | 10/2014 | Simms et al. |
| 9,010,713 | B2 * | 4/2015 | Kim ................ B60N 2/0806 248/429 |
| 9,067,514 | B2 | 6/2015 | Oh et al. |
| 9,132,750 | B2 | 9/2015 | Jahner et al. |
| 9,205,763 | B2 | 12/2015 | Anticuar et al. |
| 9,481,266 | B2 | 11/2016 | Kim et al. |
| 10,195,963 | B2 * | 2/2019 | Flick .............. B60N 2/0705 |
| 10,266,074 | B2 * | 4/2019 | Anticuar .......... B60N 2/0705 |
| 10,500,987 | B2 | 12/2019 | Anticuar et al. |
| 10,703,228 | B2 | 7/2020 | Anticuar et al. |
| 2004/0026975 | A1 | 2/2004 | Rausch et al. |
| 2004/0108762 | A1 * | 6/2004 | Borbe ............ B60N 2/0825 297/344.11 |
| 2004/0188586 | A1 | 9/2004 | Jaudouin |
| 2005/0205746 | A1 | 9/2005 | Jung et al. |
| 2006/0131470 | A1 * | 6/2006 | Yamada ............ B60N 2/0705 248/424 |
| 2009/0051208 | A1 | 2/2009 | Szybisty et al. |
| 2009/0218843 | A1 | 9/2009 | Wojatzki et al. |
| 2009/0230275 | A1 | 9/2009 | Lawall et al. |
| 2010/0102192 | A1 | 4/2010 | Tarusawa et al. |
| 2011/0012005 | A1 * | 1/2011 | Jahner ............... B60N 2/0806 248/429 |
| 2011/0198464 | A1 | 8/2011 | Hoge |
| 2011/0315847 | A1 | 12/2011 | Simms et al. |
| 2012/0298828 | A1 | 11/2012 | Wakayama et al. |
| 2013/0112833 | A1 | 5/2013 | Kim |
| 2013/0264453 | A1 | 10/2013 | Dill et al. |
| 2014/0224954 | A1 | 8/2014 | Oh et al. |
| 2014/0263920 | A1 | 9/2014 | Anticuar et al. |
| 2016/0039314 | A1 * | 2/2016 | Anticuar ............ B60N 2/0715 248/429 |
| 2016/0046208 | A1 | 2/2016 | Anticuar et al. |
| 2017/0305305 | A1 | 10/2017 | Flick et al. |
| 2019/0241098 | A1 | 8/2019 | Anticuar et al. |
| 2019/0389333 | A1 | 12/2019 | Anticuar et al. |

FOREIGN PATENT DOCUMENTS

| | | |
|---|---|---|
| DE | 10206300 B4 | 12/2005 |
| DE | 102004051694 A1 | 4/2006 |
| DE | 102006009265 A1 | 8/2006 |
| DE | 102006039505 A1 | 2/2008 |
| DE | 102008025274 A1 | 12/2009 |
| DE | 102008056683 A1 | 5/2010 |
| DE | 102011100762 A1 | 11/2012 |
| DE | 102014225426 A1 | 4/2016 |
| EP | 1671836 A2 | 6/2006 |
| EP | 1621391 B1 | 11/2010 |
| FR | 2829974 A1 | 3/2003 |
| GB | 2355399 A | 4/2001 |
| JP | H07251658 A | 10/1995 |
| JP | 2006117229 A | 5/2006 |
| JP | 2007126080 A | 5/2007 |
| JP | 2008080905 A | 4/2008 |
| KR | 20020055670 A | 7/2002 |
| KR | 20090131069 A | 12/2009 |
| KR | 20130092176 A | 8/2013 |
| KR | 20130092177 A | 8/2013 |
| WO | WO-2010051903 A1 | 5/2010 |
| WO | WO-2013059312 A1 | 4/2013 |

OTHER PUBLICATIONS

Written Opinion of the International Searching Authority regarding International Application No. PCT/US2012/060605, dated Mar. 29, 2013.
Office Action regarding Chinese Patent Application No. 201290001072. 2, dated Sep. 26, 2014. Translation provided by Unitalen Attorneys at Law.
Search Report regarding European Patent Application No. 12842267. 2, dated Mar. 16, 2015.
Office Action regarding European Patent Application No. 12842267. 2, dated Mar. 8, 2016.
Office Action regarding European Patent Application No. 12842267. 2, dated Mar. 31, 2017.
Office Action regarding German Patent Application No. 102016119490. 5, dated Apr. 16, 2018. Translation provided by Witte, Weller & Partner Patentanwälte mbB.
Office Action regarding Canadian Patent Application No. 2,852,903, dated Aug. 27, 2018.
Office Action regarding Canadian Patent Application No. 2,852,903, dated Apr. 30, 2019.
Search Report regarding European Patent Application No. 19187917. 0, dated Dec. 9, 2019.
Office Action regarding German Patent Application No. 102016119490. 5, dated Jul. 13, 2020. Translation provided by Witte, Weller & Partner Patentanwälte mbB.
Office Action regarding European Patent Application No. 19187917. 0, dated Jan. 11, 2021.
Office Action regarding German Patent Application No. 102021201348. 1, dated Jul. 7, 2021. Translation provided by Bardehle Pagenberg Partnerschaft mbB.

* cited by examiner

_Fig-7_

_Fig-8_

_Fig-9_

SEAT-TRACK ASSEMBLY

CROSS-REFERENCE TO RELATED APPLICATIONS

This application claims the benefit of U.S. Provisional Application No. 62/975,453, filed on Feb. 12, 2020. The entire disclosure of the above application is incorporated herein by reference.

FIELD

The present disclosure relates to a vehicle seat-track assembly.

BACKGROUND

This section provides background information related to the present disclosure and is not necessarily prior art.

Modern vehicles typically include at least one seat assembly that is movable in a fore-aft direction relative to a floorpan of a vehicle. For example, a sport utility vehicle or minivan may incorporate a driver-seat assembly, a passenger-seat assembly, and a second-row seat assembly that are all movable in a fore-aft direction relative to the floorpan of the vehicle. Movement of the foregoing seat assemblies permits a user to adjust a position of the respective seat assembly relative to vehicle controls and/or to permit access to an area generally behind the seat assembly. For example, adjustment of a driver-seat assembly relative to a floorpan of a vehicle permits the driver to move the seat assembly closer to or farther away from a steering wheel of the vehicle. Likewise, permitting adjustment of a passenger-seat assembly in a fore-aft direction relative to a floorpan of a vehicle permits a user to adjust a position of the passenger seat relative to controls of the vehicle and/or to access an area behind the passenger seat to gain access to a second-row seat assembly or to gain access to a storage compartment of the vehicle.

Seat assemblies that are permitted to move in a fore-aft direction relative to a floorpan of a vehicle typically include a seat-track assembly that provides for such movement. Such seat-track assemblies typically include a first component that is fixed to a floorpan of a vehicle and a second component that is fixed for movement with a vehicle seat. The second component is selectively movable relative to the first component and, thus, permits selective movement of the seat assembly relative to the first component. Permitting movement of the second component and seat assembly relative to the first component likewise permits movement of the seat assembly and second component relative to the floorpan of the vehicle.

While conventional seat assemblies incorporate a seat-track assembly that permits for selective adjustment of a vehicle seat in a fore-aft direction relative to a floorpan of a vehicle, such seat-track assemblies do not provide an occupant with the ability to adjust a position of the seat assembly relative to the floorpan in small increments. Further, conventional seat assemblies typically require a user to move the seat assembly greater than five millimeters (5 mm) in either the fore or aft direction following release of an actuation mechanism to allow a locking mechanism associated with the seat-track assembly to properly engage and fix a position of the seat assembly relative to the floorpan. Finally, while conventional seat-track assemblies adequately fix a position of a seat assembly relative to a floorpan of a vehicle, such seat-track assemblies may experience a degree of rattling or "chucking" during use caused by relative movement between the various components of the seat-track assembly, thereby creating undesirable noise during use.

SUMMARY

This section provides a general summary of the disclosure, and is not a comprehensive disclosure of its full scope or all of its features.

In one form, the present disclosure provides a seat-track assembly that includes a first track member, a second track member and a locking mechanism. The first track member includes a first sidewall and a second sidewall opposing the first sidewall. The first and second sidewalls have locking features. The second track member is slidably supported by the first track member. The locking mechanism is disposed at least partially between the first track member and the second track member and includes a first locking pawl and a second locking pawl. Each of the first and second locking pawls being independently movable between a locked state and an unlocked state. The first and second locking pawls each include a main body and a plurality of locking elements extending from the main body. The plurality of locking elements of each of the first and second locking pawls are engaged with selected ones of the locking features in the locked state. The plurality of locking elements of each of the first and second locking pawls are disengaged from the locking features in the unlocked state. Relative movement between the first track member and the second track member is restricted when the first locking pawl is in the locked state. The first track member and the second track member are allowed to move relative to each other when the first and second locking pawls are in the unlocked state. Each of the locking features of the first sidewall includes a first ramped surface and a first straight surface that opposes the first ramped surface and each of the locking features of the second sidewall includes a second ramped surface and a second straight surface that opposes the second ramped surface. Each locking feature of the first sidewall corresponds to a respective locking feature of the second sidewall. The first ramped surface and the second straight surface of corresponding locking features are proximate a front end of the first track member and the first straight surface and the second ramped surface of the corresponding locking features are proximate a rear end of the first track member. When first locking pawl is in the locked state, the plurality of locking elements of the first locking pawl contact the first ramped surface of the first sidewall and the second ramped surface of the second sidewall.

In some configurations of the seat-track assembly of the above paragraph, when the first locking pawl is in the locked state, a clearance gap exists between the plurality of locking elements of the first locking pawl and the first and second straight surfaces of the first and second sidewalls, respectively.

In some configurations of the seat-track assembly of any one or more of the above paragraphs, the clearance gap is less than a width of each of the plurality of locking elements of the first locking pawl.

In some configurations of the seat-track assembly of any one or more of the above paragraphs, the first and second ramped surfaces of the first and second sidewalls, respectively, are angled between 1 degree and 15 degrees with respect to a respective vertical axis.

In some configurations of the seat-track assembly of any one or more of the above paragraphs, each locking feature of the first sidewall includes a first upper surface and each locking feature of the second sidewall includes a second upper surface. The first straight surface extends perpendicular to the first upper surface and the second straight surface extends perpendicular to the second upper surface.

In some configurations of the seat-track assembly of any one or more of the above paragraphs, when the first locking pawl is in the locked state, a gap exists between the plurality of locking elements of the first locking pawl and the first and second upper surfaces of the first and second sidewalls, respectively.

In some configurations of the seat-track assembly of any one or more of the above paragraphs, the second track member further includes a third sidewall and a fourth sidewall. The third sidewall has slots formed therein. Each slot of the third sidewall includes a third surface and a fourth surface opposing the third surface. The slots of the third sidewall are aligned with respective locking features of the first sidewall when the first locking pawl is in the locked state. The fourth sidewall opposes the third sidewall and has slots formed therein. Each slot of the fourth sidewall includes a fifth surface and a sixth surface opposing the fifth surface. The slots of the fourth sidewall are aligned with respective locking features of the second sidewall when the first locking pawl is in the locked state. Each slot of the third sidewall corresponds to a respective slot of the fourth sidewall. The third surface and the fifth surface of corresponding slots are proximate a front end of the second track member and the fourth surface and the sixth surface of the corresponding slots are proximate a rear end of the second track member. When the first locking pawl is in the locked state, each locking element extending from a first end of the main body of the first locking pawl extends through one slot of the third sidewall and the aligned locking feature of the first sidewall, and each locking element extending from a second end of the main body of the first locking pawl extends through one slot of the fourth sidewall and the aligned locking feature of the second sidewall. When first locking pawl is in the locked state, the locking elements extending from the first end of the first locking pawl contacts the third surface of the third sidewall and the locking elements extending from the second end of the first locking pawl contacts the sixth surface of the fourth sidewall.

In some configurations of the seat-track assembly of any one or more of the above paragraphs, when the first locking pawl is in the locked state, the locking elements extending from the first end of the main body of the first locking pawl is spaced apart from the fourth surface of the third sidewall and the locking elements extending from the second end of the main body of the first locking pawl is spaced apart from the fifth surface of the fourth sidewall.

In some configurations of the seat-track assembly of any one or more of the above paragraphs, when the first locking pawl is in the locked state, the first locking pawl is rotationally biased so that the locking elements extending from the first end of the main body of the first locking pawl contacts the third surface of the third sidewall and the locking elements extending from the second end of the main body of the first locking pawl contacts the sixth surface of the fourth sidewall.

In another form, the present disclosure provides a seat-track assembly for a seat assembly disposed within the vehicle. The seat-track assembly includes a first track member, a second track member and a locking mechanism. The first track member includes a first sidewall and a second sidewall opposing the first sidewall. The first and second sidewalls have locking features. The second track member is slidably supported by the first track member. The locking mechanism is disposed at least partially between the first track member and the second track member and includes a first locking pawl and a second locking pawl. Each of the first and second locking pawls being independently movable between a locked state and an unlocked state. The first and second locking pawls each include a main body and a plurality of locking elements extending from the main body. The plurality of locking elements of each of the first and second locking pawls are engaged with selected ones of the locking features in the locked state. The plurality of locking elements of each of the first and second locking pawls are disengaged from the locking features in the unlocked state. Relative movement between the first track member and the second track member is restricted when the first locking pawl is in the locked state. The first track member and the second track member are allowed to move relative to each other when the first and second locking pawls are in the unlocked state. Each of the locking features of the first sidewall includes a first ramped surface and a first straight surface that opposes the first ramped surface and each of the locking features of the second sidewall includes a second ramped surface and a second straight surface that opposes the second ramped surface. Each locking feature of the first sidewall corresponds to a respective locking feature of the second sidewall. The first ramped surface and the second straight surface of corresponding locking features are proximate a front end of the first track member and the first straight surface and the second ramped surface of the corresponding locking features are proximate a rear end of the first track member. When the first locking pawl is in the locked state, the plurality of locking elements of the first locking pawl contact the first ramped surface of the first sidewall and the second ramped surface of the second sidewall. When first locking pawl is in the locked state, the plurality of locking elements of the first locking pawl are spaced apart from the first straight surface of the first sidewall and the second straight surface of the second sidewall. When the first locking pawl is in the locked state and the vehicle experiences an impact event, the plurality of locking elements of the first locking pawl abut against the first straight surface of the first sidewall and the second straight surface of the second sidewall to prevent the first locking pawl from moving from the locked state to the unlocked state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With particular reference to FIGS. 1-11, a seat-track assembly 10 for use with a seat assembly 12 is provided. The seat-track assembly 10 may include a first track assembly 14 and a second track assembly 16 that cooperate to selectively permit fore and aft adjustment of the seat assembly 12 relative to an external structure such as, for example, a floorpan of a vehicle (neither shown). The first track assembly 14 and the second track assembly 16 may be identical in both structure and function. Accordingly, only the first track assembly 14 will be described and shown in detail.

The first track assembly 14 may include a lower track or lower track member 18 fixedly attached to a floorpan of a vehicle (neither shown), an upper track or upper track member 20 slidably supported by the lower track 18 relative to the floorpan, and a locking mechanism 22 at least partially disposed between the lower track 18 and the upper track 20. In operation, the locking mechanism 22 may selectively fix a position of the upper track 20 relative to the lower track 18 when in a locked state and may permit movement of the upper track 20 relative to the lower track 18 when in an unlocked state.

The lower track 18 may be attached to the floorpan via a suitable process such as, for example, welding and/or staking and may include one or more projections (not shown) to facilitate attachment of the lower track 18 to the floorpan. The lower track 18 may include a bottom wall 24 having a series of openings and a pair of sidewalls 26*a*, 26*b* that extend generally from the bottom wall 24. The bottom wall 24 may be integrally formed with the sidewalls 26*a*, 26*b* and may cooperate with the sidewalls 26*a*, 26*b* to form a channel 28 extending substantially along a length of the lower track 18. The sidewalls 26*a*, 26*b* may also include a channel 30 (FIG. 3) extending along a length of each sidewall 26*a*, 26*b* and may include a series of locking features 32 separated by a series of projections 34 (FIGS. 4, 6-8, 9 and 10).

Figure 6:
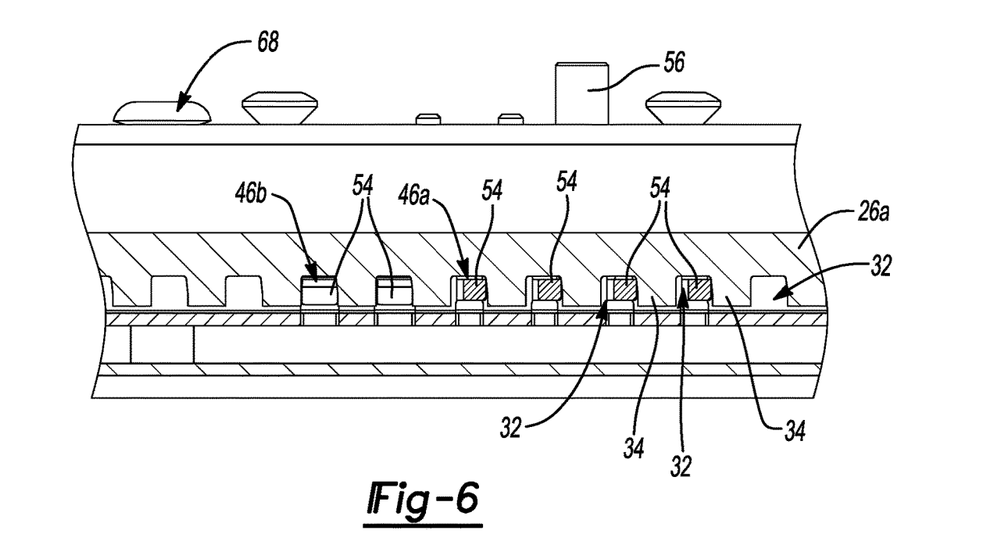
FIG. 6 is a cross-sectional view of the track assembly of FIG. 3 taken along line 6-6.
Figure 7:
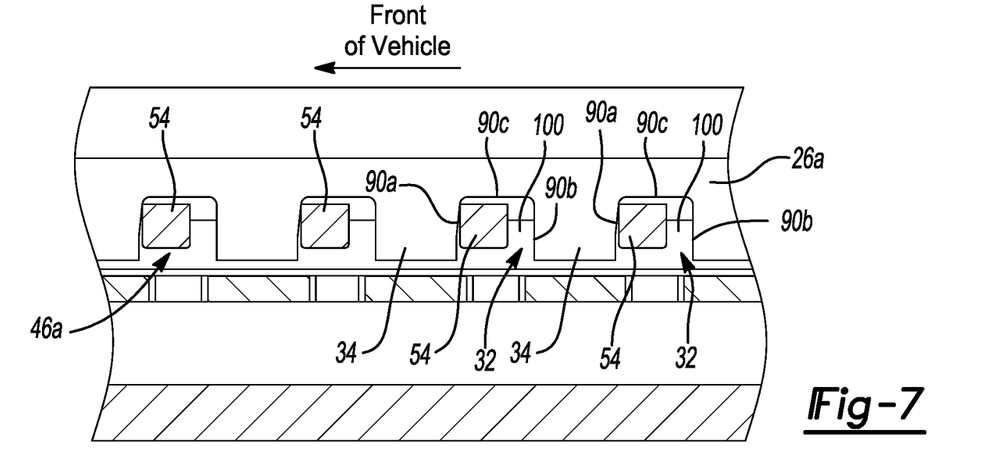
FIG. 7 is a cross-sectional view of one sidewall of a lower track of the track assembly of FIG. 2.
Figure 8:
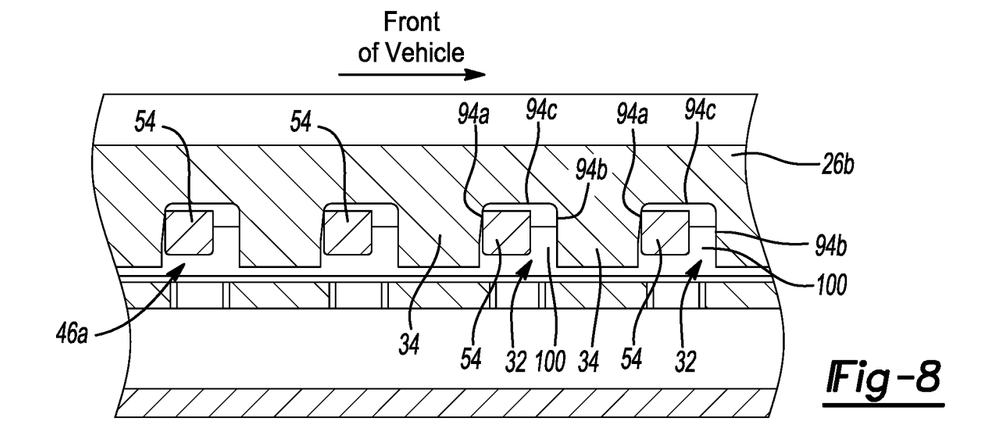
FIG. 8 is a cross-sectional view of the other sidewall of the lower track of the track assembly of FIG. 2.

The locking features 32 may each include a width substantially equal to 5 mm, for example, such that center portions of adjacent locking features 32 are separated by approximately 10 mm. As shown in FIGS. 6-8, adjacent locking features 32 are separated from one another by a projection 34, which likewise may include a width substantially equal to 5 mm. As will be described in greater detail below, each locking feature 32 may receive and position a portion of the locking mechanism 22 therein to selectively prevent movement of the upper track 20 relative to the lower track 18.

Each of the locking features 32 of the sidewall 26a includes a ramped surface 90a, a straight or vertical surface 90b that opposes the ramped surface 90a and an upper surface 90c. The ramped surface 90a extends at an angle α with respect to a vertical axis 91 (FIG. 10; the vertical axis 91 extends perpendicular to the upper surface 90c). The angle α may be between 1 degree and 15 degrees, for example. In some example embodiments, the angle α may be six degrees. The straight surface 90b extends perpendicular to the upper surface 90c. The ramped surface 90a is proximate a front end 92 of the lower track 18 (or front end of the vehicle) and the straight surface 90b is proximate a rear end 93 of the lower track 18 (or rear end of the vehicle). In other words, for each locking feature 32, the ramped surface 90a is closer to the front end 92 than the straight surface 90b of the same locking feature 32.

Each of the locking features 32 of the sidewall 26b includes a ramped surface 94a, a straight or vertical surface 94b that opposes the ramped surface 94a and an upper surface 94c. The ramped surface 94a extends at an angle β with respect to a vertical axis 95 (FIG. 11; the vertical axis 95 extends perpendicular to the upper surface 94c). The angle β may be between 1 degree and 15 degrees, for example. In some example embodiments, the angle α may be six degrees. The straight surface 94b extends perpendicular to the upper surface 94c. The ramped surface 94a is proximate the rear end 93 of the lower track 18 (or rear end of the vehicle) and the straight surface 94b is proximate the front end 92 of the lower track 18 (or front end of the vehicle). In other words, for each locking feature 32, the ramped surface 94a is closer to the rear end 93 than the straight surface 94b of the same locking feature 32. Each locking feature 32 of the sidewall 26b corresponds to (aligned with) a respective locking feature 32 of the sidewall 26a. In this way, the ramped surface 90a and the straight surface 94b of corresponding locking features 32 are proximate the front end 92 of the lower track 18, and the ramped surface 94a and the straight surface 90b of the corresponding locking features 32 are proximate the rear end 93 of the lower track 18. Stated differently, the ramped surface 90a of each locking feature 32 of the sidewall 26a faces the rear end 93 of the lower track 18 (the straight surface 90b faces the front end 92) and the ramped surface 94a of each locking feature 32 of the sidewall 26b faces the front end 92 of the lower track 18 (the straight surface 94b faces the rear end 93).

As described above, the lower track 18 slidably receives the upper track 20 to permit selective movement of the upper track 20 relative to the lower track 18. Such movement may be facilitated by one or more ball-cage assemblies 21 that may be at least partially received within the channels 30 of the sidewalls 26a, 26b. The ball-cage assemblies 21 may each include a pair of housings 23 having one or more ball bearings 25 (FIG. 3) and a bracket 27 extending between and connecting the housings 23. The ball bearings 25 are constrained by the housings 23 but are permitted to rotate relative thereto. Such rotation of the ball bearings 25 relative to the housings 23 facilitates movement of the upper track 20 relative to the lower track 18 when the locking mechanism 22 is in the unlocked state.

Figure 1:
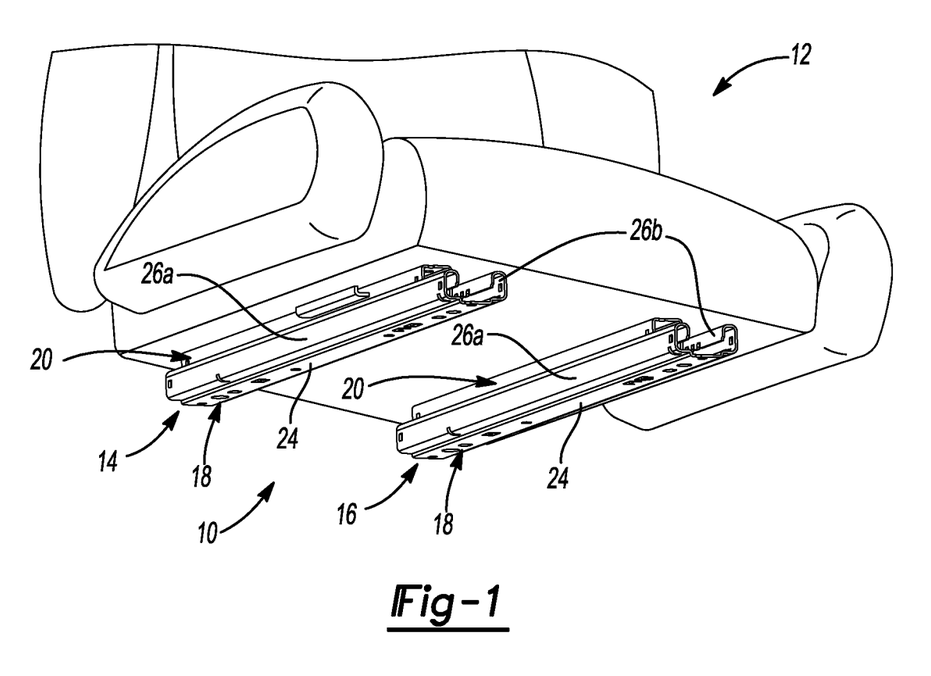
FIG. 1 is a partial perspective view of a seat assembly incorporating a seat-track assembly in accordance with the principles of the present disclosure.
Figure 2:
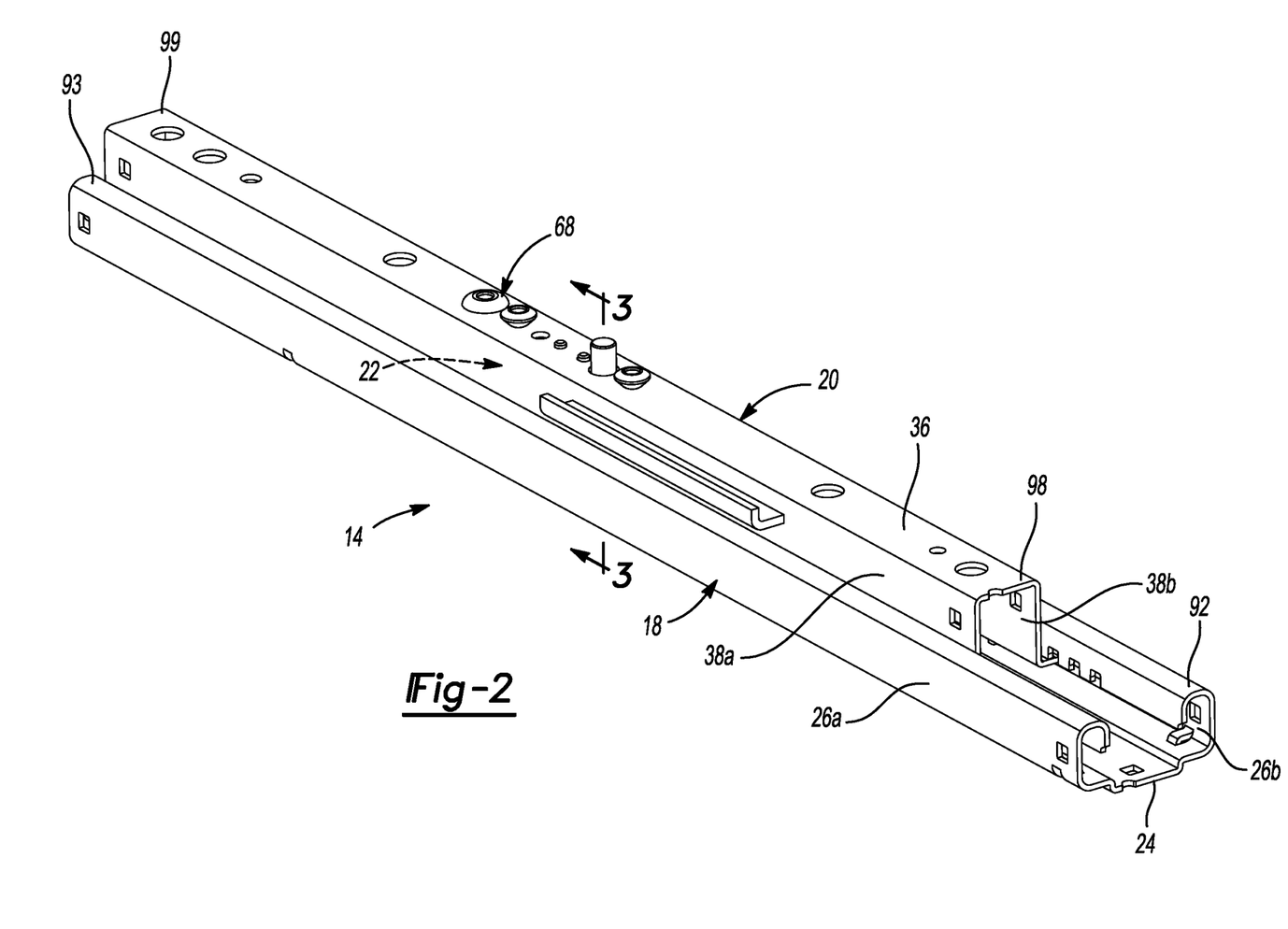
FIG. 2 is a perspective view of a track assembly of the seat-track assembly of FIG. 1.
Figure 3:
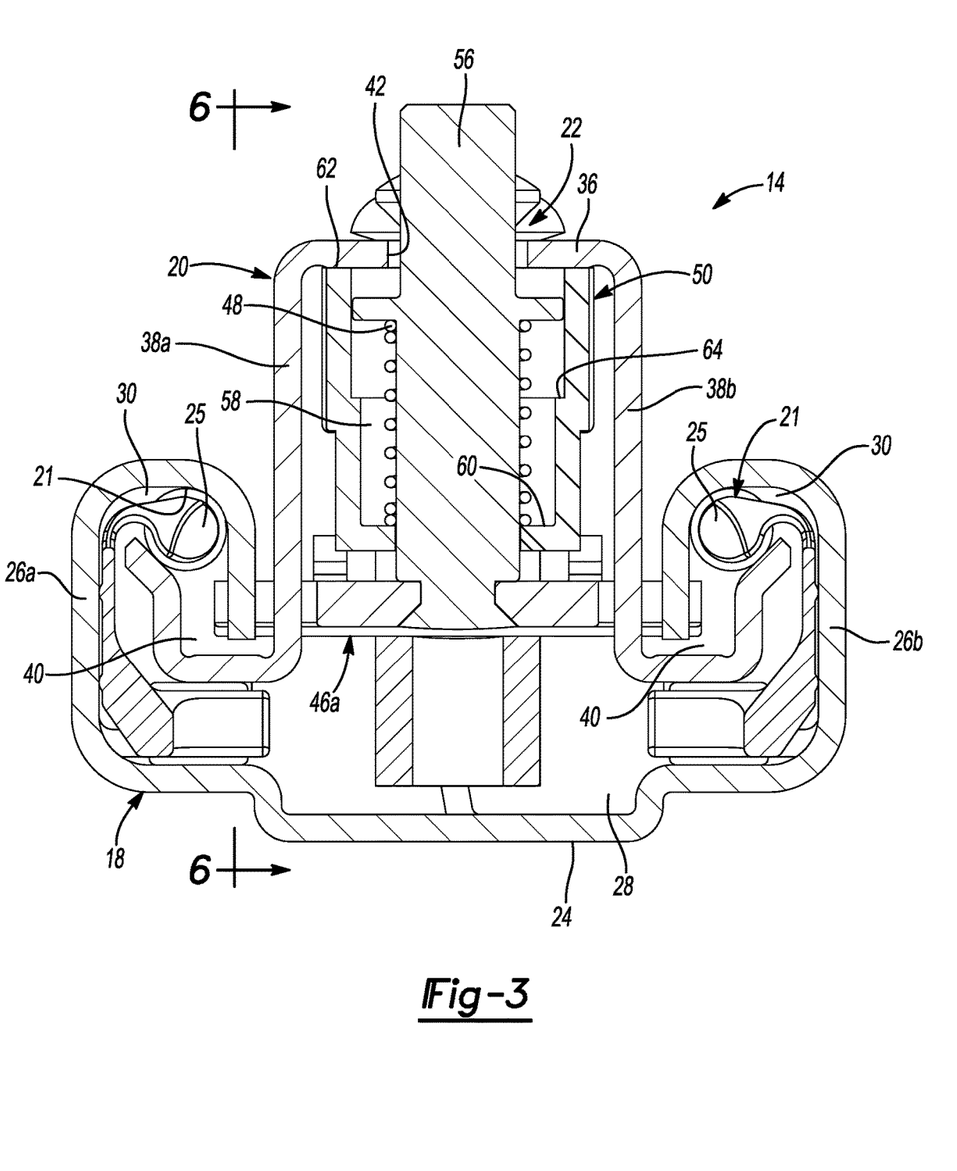
FIG. 3 is a cross-sectional view of the track assembly of FIG. 2 taken along line 3-3.
Figure 4:
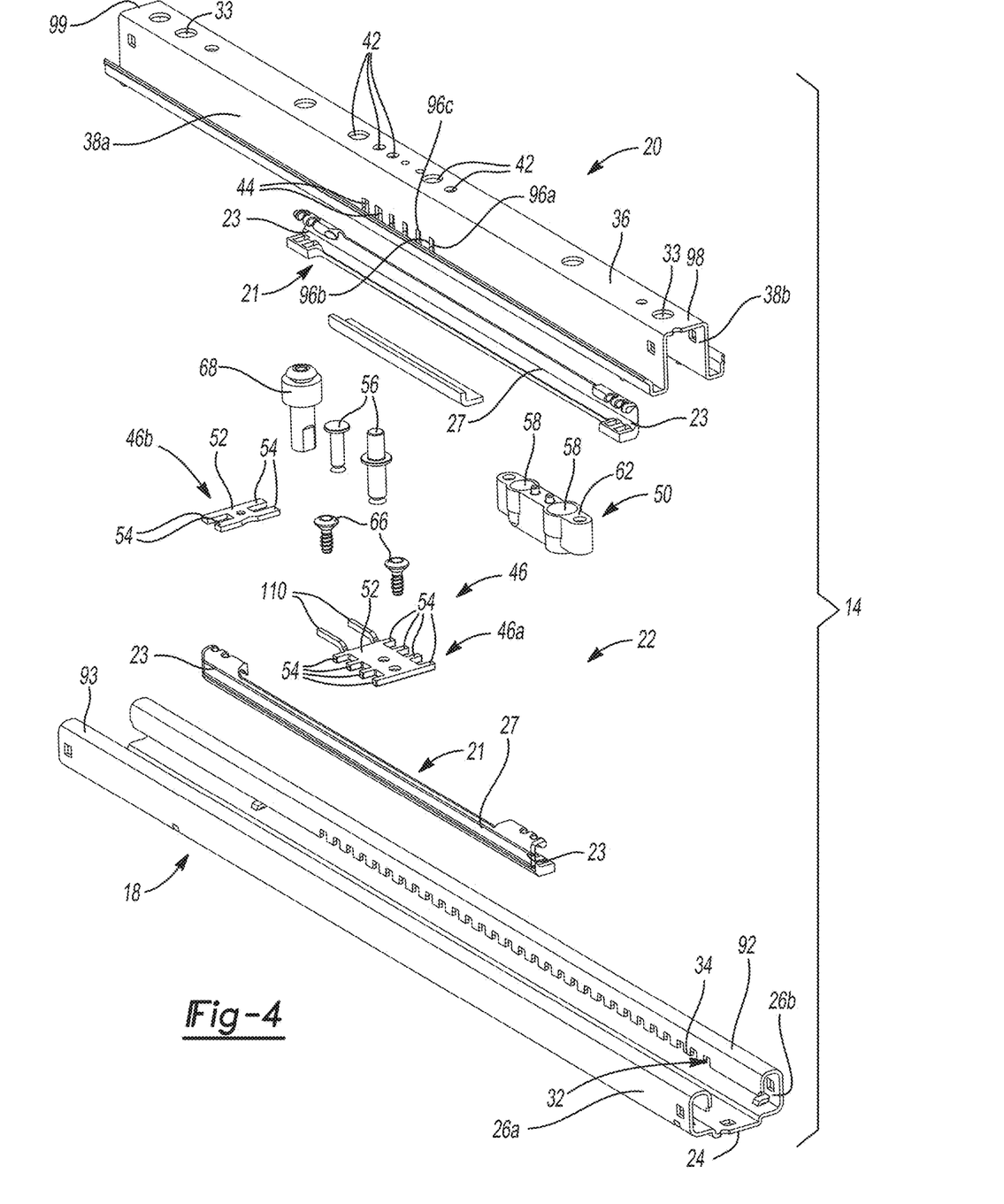
FIG. 4 is an exploded view of the track assembly of FIG. 2.

As shown in FIGS. 2-4, the upper track 20 is shown to include a top wall 36 and a pair of sidewalls 38a, 38b. The top wall 36 may be integrally formed with the sidewalls 38a, 38b, whereby each of the sidewalls 38a, 38b includes a channel 40 extending substantially along a length of the upper track 20. The top wall 36 may include a series of apertures 42 (FIG. 4) that receive a portion of the locking mechanism 22 therein. The sidewalls 38a, 38b may include a series of slots 44 that may receive a portion of the locking mechanism 22 therein.

As shown in FIG. 4, each slot 44 of the sidewall 38a includes opposing side surfaces 96a, 96b and an upper surface 96c. Each slot 44 of the sidewall 38b includes opposing side surfaces 97a, 97b (FIG. 9) and an upper surface (not shown). Each slot 44 of the sidewall 38a corresponds to (aligned with) a respective slot 44 of the sidewall 38b. In this way, the side surface 96a and the side surface 97a of corresponding slots 44 are proximate a front end 98 of the upper track 20, and the side surface 96b and the side surface 97b of the corresponding slots 44 are proximate a rear end 99 of the upper track 20.

Finally, the upper track 20 may include a series of mounting apertures 33 that cooperate with fasteners (none shown) to attach a portion of the seat assembly 12 to the upper track 20. The fasteners may be used to attach a portion of the seat assembly 12 to the upper track 20 to allow the seat assembly 12 to be moved with the upper track 20 when the upper track 20 is moved relative to the lower track 18.

Figure 5:
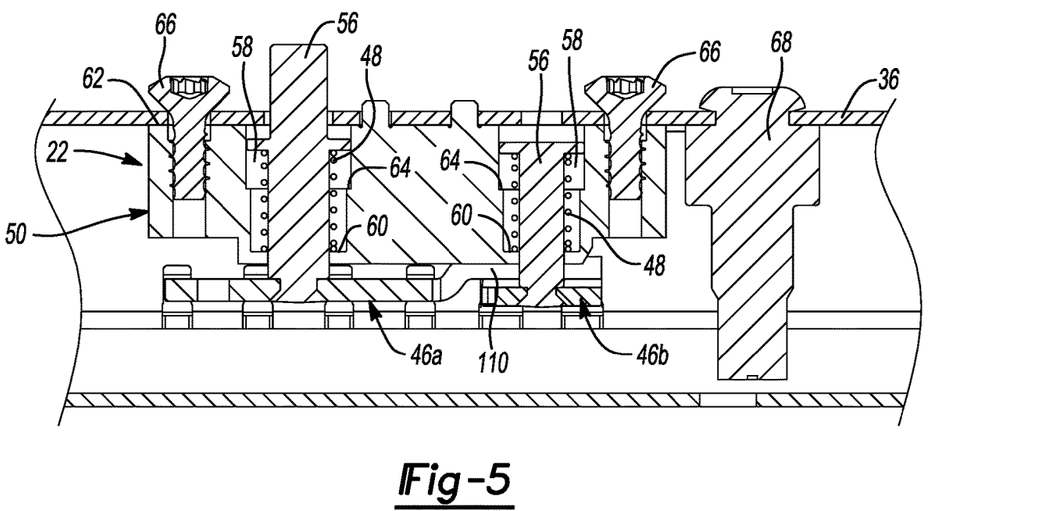
FIG. 5 is a partial cross-sectional view of the track assembly of FIG. 2.

With particular reference to FIGS. 3-5, the locking mechanism 22 is shown to include a series of locking pawls 46a, 46b (together known as pawls 46), a series of biasing members 48, and a mounting bracket 50. The locking pawls 46 may be received within the upper track 20 generally between the top wall 36 and the sidewalls 38a, 38b and may include a main body 52, a pair of locking arms or elements 54, and an actuation arm 56. The locking arms 54 and the actuation arm 56 may be integrally formed with the main body 52. Alternatively, the actuation arm 56 may separately formed from the main body 52 and may be fixed for movement with the main body 52 by inserting a distal end of the actuation arm 56 into a respective aperture formed in the main body 52. The distal end of each actuation arm 56 may be press-fit into the respective apertures and/or may be retained via a suitable process such as, for example, welding or staking.

In one configuration, the biasing members 48 may be coil springs that generally surround a portion of each actuation arm 56 and are received within a pocket 58 of the mounting bracket 50. The biasing members 48 are retained within the pocket 58 to allow the biasing members 48 to exert a force on each locking pawl 46a, 46b via each actuation arm 56 to bias each locking pawl 46a, 46b upwardly.

The mounting bracket 50 may include a bottom wall 60, a top wall 62, and a pair of stop features 64. The bottom wall 60 may be disposed at a bottom of the pocket 58 and may interact with the biasing members 48 to retain and position each biasing member 48 within the mounting bracket 50. The top wall 62 may abut the top wall 36 of the upper track 20 and may be attached to the top wall 36 via a pair of rivets 66. Specifically, the rivets 66 may be respectively received within the apertures 42 of the upper track 20 to retain and position the mounting bracket 50 relative to the upper track 20.

The stop features 64 (FIG. 3) may be spaced apart from the bottom wall 60 by a predetermined distance and may cooperate with the bottom wall 60 to at least partially define the pocket 58 in which the biasing members 48 are disposed. The stop features 64 may interact with the actuation arms 56 to limit movement of the actuation arms 56 in a downward direction when the biasing members 48 are compressed. A stop fastener 68 may be supported by the upper track 20 and may extend through a respective aperture 42 of the upper track 20. The stop fastener 68 may provide a hard stop for the locking mechanism 22, thereby limiting travel of the upper track 20 in the fore or aft direction.

With reference to FIGS. 1-11, operation of the seat-track assembly 10 will be described in detail. When the seat-track assembly 10 is in the locked state, the locking pawls 46 are in the locked state such that the locking arms 54 of each locking pawl 46 are received within respective locking features 32 of the lower track 18. As shown in FIGS. 5-7, the locking arms 54 extending from one end of the main body 52 of the locking pawl 46a may be in contact with the ramped surfaces 90a of the sidewall 26a and the locking arms 54 extending from the other end of the main body 52 of the locking pawl 46a may be in contact with the ramped surfaces 94a of the sidewall 26b of the lower track 18, thereby restricting relative movement between the lower track 18 and the upper track 20 in two opposite directions (i.e., fore and aft directions). It should be understood that the locking arms 54 extending from the one end of the main body 52 of the locking pawl 46a are spaced apart from the straight surfaces 90b of the sidewall 26a and the locking arms 54 extending from the other end of the main body 52 of the locking pawl 46a are spaced apart from the straight surfaces 94b of the sidewall 26b. A space or gap 100 between the locking arms 54 and the straight surfaces 90b, 94b is less than a width of the locking arms 54 of the locking pawl 46a.

The ramped surfaces 90a, 94a of the locking features 32 of the lower track 18 cause each locking feature 32 to have a decreasing width in a direction moving toward the upper surfaces 90c, 94c. As such, when the biasing members 48 exert a force on the locking pawls 46 to urge the locking arms 54 into the locking features 32, the locking arms 54 of the locking pawl 46a continue movement into the locking features 32 until the locking arms 54 of the locking pawl 46a are in contact with the lower track 18 at the ramped surfaces 90a, 94a.

The locking pawls 46 are biased into the locked state and, as a result, into the locking features 32 of the lower track 18 by the biasing members 48. Specifically, the biasing members 48 are disposed within the pocket 58 of the mounting bracket 50 and exert a force on each actuation arm 56. If the locking arms 54 of the locking pawls 46 are aligned with the locking features 32 of the lower track 18, the locking arms 54 will move into respective locking features 32 of the lower track 18 to restrict relative movement between the lower track 18 and the upper track 20.

Figure 9:
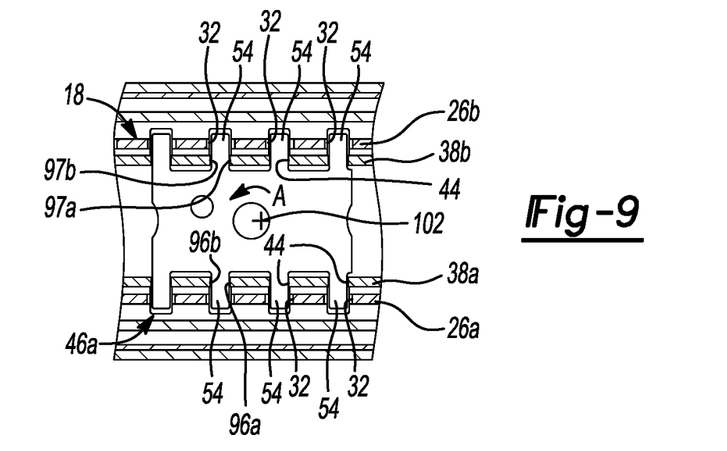
FIG. 9 is another cross-sectional view of the track assembly of FIG. 2.

As shown in FIG. 9, when the locking pawl 46a is in the locked state, the locking arms 54 also extend through slots 44 of the sidewalls 38a, 38b of the upper track 20. Due to the locking arms 54 extending from the one end of the main body 52 contacting the ramped surfaces 90a of the sidewall 26a that are proximate the front end 92 of the lower track 18 and the locking arms 54 extending from the other end of the main body 52 contacting the ramped surfaces 94a of the sidewall 26b that are proximate the rear end 93 of the lower track 18, the locking pawl 46a is rotationally bias about a vertical axis 102 in Direction A. This, in turn, causes the locking arms 54 extending from the one end of the main body 52 to contact the side surfaces 96a proximate the front end 98 of the upper track 20 and the locking arms 54 extending from the other end of the main body 52 to contact the surfaces 97b proximate the rear end 99 of the upper track 20, thereby removing freeplay between the locking pawl 46a and the upper track 20.

The locking mechanism 22 may be moved from the locked state to the unlocked state when a force is applied to the actuation arm 56 associated with the locking pawl 46a. The force applied to the actuation arm 56 associated with the locking pawl 46a may be generated by an actuation assembly (not shown). Such an actuation assembly may be supported relative to the upper track 20 via a mounting bracket (not shown) to allow the actuation assembly to selectively exert a force on the actuation arm 56 associated with the locking pawl 46a.

Regardless of the particular configuration of the actuation assembly, when a force is applied to the actuation arm 56 associated with the locking pawl 46a, the actuation arm 56 associated with the locking pawl 46a compresses the biasing member 48 within the respective pocket 58 of the mounting bracket 50. In so doing, the locking arms 54 of the locking pawl 46a disengages the locking features 32 of the lower track 18. Rails 110 extending from the main body 52 of the locking pawl 46a contacts the locking pawl 46b, which causes the locking arms 54 of the locking pawl 46b to also disengage the locking features 32 of the lower track 18. Once the locking arms 54 of the locking pawls 46 disengage the respective locking features 32 of the lower track 18, relative movement between the lower track 18 and the upper track 20 is permitted. As such, a force may be applied to the seat assembly 12 to adjust a position of the seat assembly 12 relative to the lower track 18 by moving the seat assembly 12 along with the upper track 20 relative to the lower track 18.

Once a desired position of the seat assembly 12 and, thus, a desired position of the upper track 20 relative to the lower track 18 is achieved, the force applied to the actuation arm 56 associated with the locking pawl 46a may be released. When the force applied to the actuation arm 56 is released, the biasing members 48 once again exert a force on the actuation arms 56 in the upward direction. If the locking pawls 46 are positioned relative to the locking features 32 and the projections 34 of the lower track 18 such that each locking arm 54 opposes a projection 34, the biasing members 48 cause the locking arms 54 to engage the projections 34, thereby preventing the locking arms 54 from being received within the locking features 32 and returning the locking mechanism 22 to the locked state.

At this point, a force may be applied to the upper track 20 via the seat assembly 12 to move the upper track 20 relative to the lower track 18. Movement of the upper track 20 relative to the lower track 18 causes the locking arms 54 of the locking pawls 46 to travel along the projections 34 until the locking pawls 46 are properly aligned with the locking features 32 such that the locking arms 54 of the locking pawls 46 may be received within respective locking features 32 of the lower track 18.

When the upper track 20 is sufficiently moved relative to the lower track 18 such that the locking pawls 46 are aligned with the locking features 32, the biasing members 48 moves the actuation arms 56 toward the top wall 36 of the upper track 20. In so doing, the locking pawls 46 are likewise moved toward the top wall 36 of the upper track 20, which causes the locking arms 54 to engage the locking features 32 of the lower track 18, thereby returning the locking mechanism 22 to the locked state.

Figure 10:
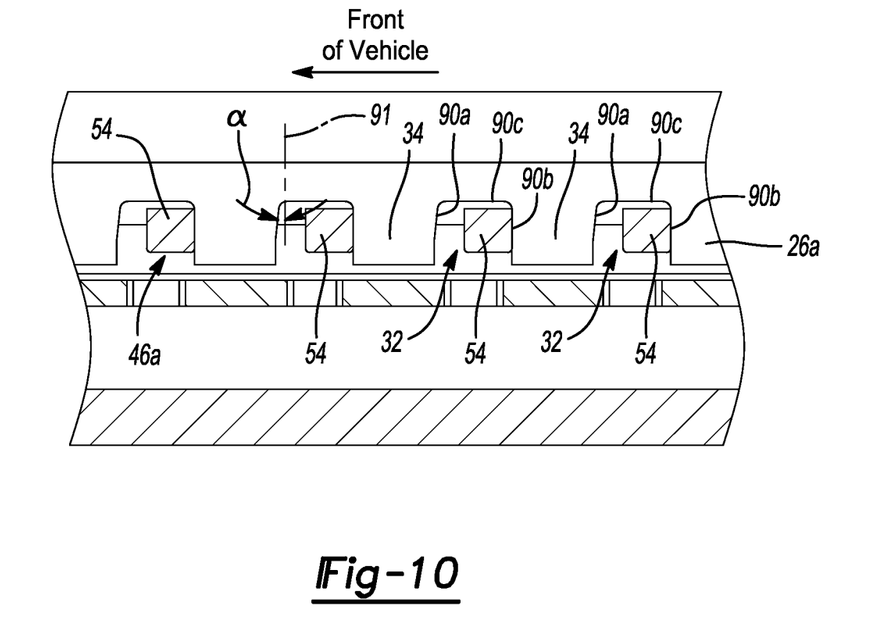
FIG. 10 is a cross-sectional view of one sidewall of the lower track of the track assembly after a vehicle impact event.
Figure 11:
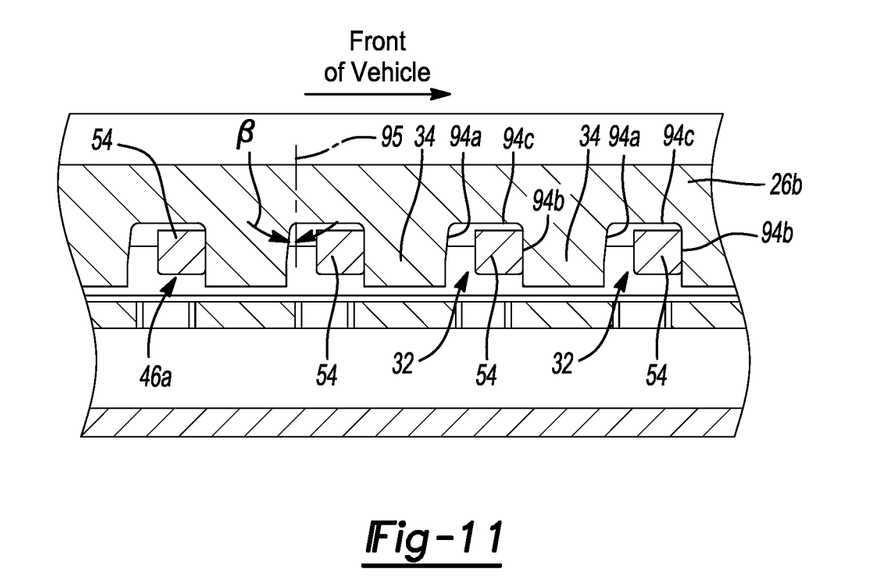
FIG. 11 is a cross-sectional view of the other sidewall of the lower track of the track assembly after the vehicle impact event.

As shown in FIGS. 10 and 11, if the vehicle experiences an impact event while the pawls 46 are in the locked state, the locking arms 54 extending from the one end of the main body 52 of the locking pawl 46a abut against the straight surfaces 90b of the sidewall 26a and the locking arms 54 extending from the other end of the main body 52 of the locking pawl 46a abut against the straight surfaces 94b of the sidewall 26b. In this way, the locking pawls 46 are prevented from moving from the locked state to the unlocked state.

As shown in FIG. 4, the locking pawl 46a may include eight (8) locking arms 54 and the locking pawl 46b may include four (4) locking arms 54. Namely, the locking pawl 46a may include four locking arms 54 on one side of the locking pawl 46a and may likewise include four locking arms 54 on the other side of the locking pawl 46a. The locking pawl 46b may include two locking arms 54 on one side of the locking pawl 46b and may likewise include two locking arms 54 on the other side of the locking pawl 46b. As such, when the locking arms 54 are in the locked state and are respectively received within locking features 32 of the lower track 18, a total of eight (8) locking arms 54 of the locking pawl 46a are engaged with the locking features 32 of the lower track 18 while a total of four (4) locking arms 54 of the locking pawl 46b are also engaged with the locking features 32 of the lower track 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat-track assembly comprising:
    a first track member including a first sidewall and a second sidewall opposing the first sidewall, the first and second sidewalls having locking features;
    a second track member slidably supported by the first track member; and
    a locking mechanism disposed at least partially between the first track member and the second track member and including a first locking pawl and a second locking pawl, each of the first and second locking pawls being movable between a locked state and an unlocked state, wherein:
        the first and second locking pawls each include a main body and a plurality of locking elements extending from the main body, the plurality of locking elements of each of the first and second locking pawls are engaged with selected ones of the locking features in the locked state,
        the plurality of locking elements of each of the first and second locking pawls are disengaged from the locking features in the unlocked state,
        relative movement between the first track member and the second track member is restricted when the first locking pawl is in the locked state,
        the first track member and the second track member are allowed to move relative to each other when the first and second locking pawls are in the unlocked state,
        each of the locking features of the first sidewall includes a first ramped surface and a first straight surface that opposes the first ramped surface and each of the locking features of the second sidewall includes a second ramped surface and a second straight surface that opposes the second ramped surface, each locking feature of the first sidewall corresponds to a respective locking feature of the second sidewall,
        the first ramped surface and the second straight surface of corresponding locking features are closer to a front end of the first track member than the first straight surface and the second ramped surface of the corresponding locking features, and
        when first locking pawl is in the locked state, the plurality of locking elements of the first locking pawl contact the first ramped surface of the first sidewall and the second ramped surface of the second sidewall.

2. The seat-track assembly of claim 1, wherein when the first locking pawl is in the locked state, a clearance gap exists between each of the plurality of locking elements of the first locking pawl and each of respective ones of the first and second straight surfaces of the first and second sidewalls, respectively.

3. The seat-track assembly of claim 2, wherein the clearance gap is less than a width of each of the plurality of locking elements of the first locking pawl.

4. The seat-track assembly of claim 1, wherein the first and second ramped surfaces of the first and second sidewalls, respectively, are angled between 1 degree and 15 degrees with respect to a respective vertical axis.

5. The seat-track assembly of claim 1, wherein each locking feature of the first sidewall includes a first upper surface and each locking feature of the second sidewall includes a second upper surface, and wherein the first straight surface extends perpendicular to the first upper surface and the second straight surface extends perpendicular to the second upper surface.

6. The seat-track assembly of claim 5, wherein when the first locking pawl is in the locked state, a gap exists between the plurality of locking elements of the first locking pawl and the first and second upper surfaces of the first and second sidewalls, respectively.

7. The seat-track assembly of claim 1, wherein the second track member includes a third sidewall having slots formed therein, each slot of the third sidewall including a third surface and a fourth surface opposing the third surface, the slots of the third sidewall are aligned with respective locking features of the first sidewall when the first locking pawl is in the locked state.

8. The seat-track assembly of claim 7, wherein the second track member includes a fourth sidewall opposing the third sidewall and having slots formed therein, each slot of the fourth sidewall including a fifth surface and a sixth surface opposing the fifth surface, the slots of the fourth sidewall are aligned with respective locking features of the second sidewall when the first locking pawl is in the locked state, each slot of the third sidewall corresponds to a respective slot of the fourth sidewall, the third surface and the fifth surface of corresponding slots are closer to a front end of the second track member than the fourth surface and the sixth surface of the corresponding slots.

9. The seat-track assembly of claim 8, wherein when the first locking pawl is in the locked state, each locking element extending from a first end of the main body of the first locking pawl extends through one slot of the third sidewall and the aligned locking feature of the first sidewall, and each locking element extending from a second end of the main body of the first locking pawl extends through one slot of the fourth sidewall and the aligned locking feature of the second sidewall.

10. The seat-track assembly of claim 9, wherein when first locking pawl is in the locked state, the locking elements extending from the first end of the main body of the first locking pawl contacts the third surface of the third sidewall and the locking elements extending from the second end of the main body of the first locking pawl contacts the sixth surface of the fourth sidewall.

11. The seat-track assembly of claim 10, wherein when the first locking pawl is in the locked state, the locking elements extending from the first end of the main body of the first locking pawl are spaced apart from fourth surface of the third sidewall and the locking elements extending from the second end of the main body of the first locking pawl is spaced apart from the fifth surface of the fourth sidewall.

12. The seat-track assembly of claim 11, wherein when the first locking pawl is in the locked state, the first locking pawl is rotationally biased so that the locking elements extending from the first end of the main body of the first locking pawl contacts the third surface of the third sidewall and the locking elements extending from the second end of the main body of the first locking pawl contacts the sixth surface of the fourth sidewall.

13. The seat-track assembly of claim 1, wherein:
when first locking pawl is in the locked state, the plurality of locking elements of the first locking pawl are spaced apart from the first straight surface of the first sidewall and the second straight surface of the second sidewall, and
when the first locking pawl is in the locked state during an impact event, the plurality of locking elements of the first locking pawl abut against the first straight surface of the first sidewall and the second straight surface of the second sidewall to prevent the first locking pawl from moving from the locked state to the unlocked state.

14. The seat-track assembly of claim 1, wherein:
the first locking pawl includes a rail extending from the main body of the first locking pawl,
contact between the second locking pawl and the rail of the first locking pawl forces the second locking pawl toward the unlocked state as the first locking pawl moves toward the unlocked state, and
movement of the first locking pawl toward the locked state allows corresponding movement of the second locking pawl toward the locked state.

15. The seat-track assembly of claim 14, wherein:
the locking mechanism includes a first actuation arm extending from the main body of the first locking pawl and a second actuation arm extending from the main body of the second locking pawl,
the locking mechanism includes a mounting bracket having first and second pockets that reciprocatingly receive the first and second actuation arms, respectively,
the locking mechanism includes a first spring engaging the first actuation arm and disposed within the first pocket of the mounting bracket,
the locking mechanism includes the second spring engaging the second actuation arm and disposed within a second pocket of the mounting bracket,
the first and second springs biasing the first and second locking pawls toward the locked state, and
the rail is disposed between the main body of the second locking pawl and the mounting bracket.

16. A seat-track assembly comprising:
a first track member including a first sidewall and a second sidewall opposing the first sidewall, the first and second sidewalls having locking features;
a second track member slidably supported by the first track member; and
a locking mechanism disposed at least partially between the first track member and the second track member and including a first locking pawl and a second locking pawl, each of the first and second locking pawls being movable between a locked state and an unlocked state, wherein:
the first and second locking pawls each include a main body and a plurality of locking elements extending from the main body, the plurality of locking elements of each of the first and second locking pawls are engaged with selected ones of the locking features in the locked state,
the plurality of locking elements of each of the first and second locking pawls are disengaged from the locking features in the unlocked state,
relative movement between the first track member and the second track member is restricted when the first locking pawl is in the locked state,
the first track member and the second track member are allowed to move relative to each other when the first and second locking pawls are in the unlocked state,
the first locking pawl includes a rail extending from the main body of the first locking pawl,
contact between the second locking pawl and the rail of the first locking pawl forces the second locking pawl toward the unlocked state as the first locking pawl moves toward the unlocked state, and
movement of the first locking pawl toward the locked state allows corresponding movement of the second locking pawl toward the locked state.

17. The seat-track assembly of claim 16, wherein:
the locking mechanism includes a first actuation arm extending from the main body of the first locking pawl and a second actuation arm extending from the main body of the second locking pawl,
the locking mechanism includes a mounting bracket having first and second pockets that reciprocatingly receive the first and second actuation arms, respectively,
the locking mechanism includes a first spring engaging the first actuation arm and disposed within the first pocket of the mounting bracket,
the locking mechanism includes a second spring engaging the second actuation arm and disposed within the second pocket of the mounting bracket,
the first and second springs biasing the first and second locking pawls toward the locked state, and
the rail is disposed between the main body of the second locking pawl and the mounting bracket.

18. The seat-track assembly of claim 17, wherein the rail extends from the main body of the first locking pawl in a direction perpendicular to directions in which the locking elements extend from the first locking pawl.

19. The seat-track assembly of claim 18, wherein the first locking pawl includes another rail extending from the main body of the first locking pawl in a direction perpendicular to the directions in which the locking elements extend from the first locking pawl, and wherein the rails are parallel to each other.

20. The seat-track assembly of claim 16, wherein:
each of the locking features of the first sidewall includes a first ramped surface and a first straight surface that opposes the first ramped surface and each of the locking features of the second sidewall includes a second ramped surface and a second straight surface that opposes the second ramped surface, each locking feature of the first sidewall corresponds to a respective locking feature of the second sidewall, the first ramped surface and the second straight surface of corresponding locking features are closer to a front end of the first track member than the first straight surface and the second ramped surface of the corresponding locking features, and when first locking pawl is in the locked state, the plurality of locking elements of the first locking pawl contact the first ramped surface of the first sidewall and the second ramped surface of the second sidewall.

21. The seat-track assembly of claim 20, wherein each locking feature of the first sidewall includes a first upper surface and each locking feature of the second sidewall includes a second upper surface, wherein the first straight surface extends perpendicular to the first upper surface and the second straight surface extends perpendicular to the second upper surface, and wherein when the first locking pawl is in the locked state, a gap exists between the plurality of locking elements of the first locking pawl and the first and second upper surfaces of the first and second sidewalls, respectively, wherein the second track member includes a third sidewall having slots formed therein, each slot of the third sidewall including a third surface and a fourth surface opposing the third surface, the slots of the third sidewall are aligned with respective locking features of the first sidewall when the first locking pawl is in the locked state, wherein the second track member includes a fourth sidewall opposing the third sidewall and having slots formed therein, each slot of the fourth sidewall including a fifth surface and a sixth surface opposing the fifth surface, the slots of the fourth sidewall are aligned with respective locking features of the second sidewall when the first locking pawl is in the locked state, each slot of the third sidewall corresponds to a respective slot of the fourth sidewall, the third surface and the fifth surface of corresponding slots are closer to a front end of the second track member than the fourth surface and the sixth surface of the corresponding slots, wherein when the first locking pawl is in the locked state, each locking element extending from a first end of the main body of the first locking pawl extends through one slot of the third sidewall and the aligned locking feature of the first sidewall, and each locking element extending from a second end of the main body of the first locking pawl extends through one slot of the fourth sidewall and the aligned locking feature of the second sidewall, wherein when first locking pawl is in the locked state, the locking elements extending from the first end of the main body of the first locking pawl contacts the third surface of the third sidewall and the locking elements extending from the second end of the main body of the first locking pawl contacts the sixth surface of the fourth sidewall, wherein when the first locking pawl is in the locked state, the locking elements extending from the first end of the main body of the first locking pawl are spaced apart from fourth surface of the third sidewall and the locking elements extending from the second end of the main body of the first locking pawl is spaced apart from the fifth surface of the fourth sidewall, and wherein when the first locking pawl is in the locked state, the first locking pawl is rotationally biased so that the locking elements extending from the first end of the main body of the first locking pawl contacts the third surface of the third sidewall and the locking elements extending from the second end of the main body of the first locking pawl contacts the sixth surface of the fourth sidewall.

\* \* \* \* \*

UNITED STATES PATENT AND TRADEMARK OFFICE
CERTIFICATE OF CORRECTION

PATENT NO. : 11,225,173 B2  Page 1 of 1
APPLICATION NO. : 17/172148
DATED : January 18, 2022
INVENTOR(S) : Poptani et al.

It is certified that error appears in the above-identified patent and that said Letters Patent is hereby corrected as shown below:

In the Claims

Column 13, Line 57: Claim 15, delete "the second spring" and insert --a second spring--

Column 13, Line 58-59: Claim 15, delete "a second pocket" and insert --the second pocket--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*